(12) United States Patent
Karahashi et al.

(10) Patent No.: US 7,171,421 B2
(45) Date of Patent: Jan. 30, 2007

(54) SYSTEM FOR AUTOMATING OPERATING PARAMETER LIST PROCESS

(75) Inventors: Yoshiyuki Karahashi, San Mateo, CA (US); Francis Thomas Bolger, Wilmington, NC (US); Dianna M. Hansen, San Jose, CA (US)

(73) Assignee: General Electric Company, Schenectady, NY (US)

( * ) Notice: Subject to any disclaimer, the term of this patent is extended or adjusted under 35 U.S.C. 154(b) by 371 days.

(21) Appl. No.: 10/065,864

(22) Filed: Nov. 26, 2002

(65) Prior Publication Data

US 2004/0103072 A1  May 27, 2004

(51) Int. Cl.
*G06F 17/00* (2006.01)
*G06F 9/44* (2006.01)
*G06F 15/00* (2006.01)

(52) U.S. Cl. .......................... 707/102; 707/2; 707/10; 707/103 R; 707/104.1; 707/203; 707/204; 717/168; 712/28; 712/29

(58) Field of Classification Search .............. 707/3, 707/10, 104, 101, 200, 201, 2, 5, 102, 103 R, 707/104.1; 709/220; 705/38; 345/760, 345/810; 434/236; 717/168, 101; 712/28; 714/4
See application file for complete search history.

(56) References Cited

U.S. PATENT DOCUMENTS

| | | | | |
|---|---|---|---|---|
| 5,303,146 | A | 4/1994 | Ammirato et al. | 715/503 |
| 5,499,180 | A | 3/1996 | Ammirato et al. | 715/503 |
| 5,995,979 | A * | 11/1999 | Cochran | 707/104.1 |
| 6,125,388 | A | 9/2000 | Reisman | 709/218 |
| 6,134,535 | A | 10/2000 | Belzberg | 705/37 |
| 6,195,795 | B1 * | 2/2001 | Block et al. | 717/101 |
| 6,253,027 | B1 | 6/2001 | Weber et al. | 380/287 |
| 6,292,811 | B1 | 9/2001 | Clancey et al. | 715/503 |
| 6,334,178 | B1 * | 12/2001 | Cannon et al. | 712/28 |
| 6,473,898 | B1 * | 10/2002 | Waugh et al. | 717/168 |
| 6,820,088 | B1 * | 11/2004 | Hind et al. | 707/101 |
| 6,957,209 | B1 * | 10/2005 | Quernemoen | 707/2 |
| 2002/0007468 | A1 * | 1/2002 | Kampe et al. | 714/4 |
| 2002/0152289 | A1 * | 10/2002 | Dube | 709/220 |
| 2002/0194204 | A1 * | 12/2002 | Mosher et al. | 707/200 |
| 2003/0008268 | A1 * | 1/2003 | Thomas | 434/236 |
| 2003/0061219 | A1 * | 3/2003 | Monteverde | 707/10 |
| 2003/0078915 | A1 * | 4/2003 | Chaudhuri et al. | 707/3 |
| 2003/0095150 | A1 * | 5/2003 | Trevino et al. | 345/810 |
| 2003/0144949 | A1 * | 7/2003 | Blanch | 705/38 |
| 2003/0169292 | A1 * | 9/2003 | Carew et al. | 345/760 |
| 2003/0229626 | A1 * | 12/2003 | Nayak | 707/3 |
| 2005/0050116 | A1 * | 3/2005 | Gross et al. | 707/204 |
| 2005/0071358 | A1 * | 3/2005 | Hind et al. | 707/101 |
| 2005/0125459 | A1 * | 6/2005 | Sutinen et al. | 707/201 |
| 2005/0223000 | A1 * | 10/2005 | Davis et al. | 707/5 |

* cited by examiner

*Primary Examiner*—Thuy N. Pardo
(74) *Attorney, Agent, or Firm*—Harness, Dickey & Pierce, P.L.C.

(57) ABSTRACT

A system for automating an operating parameter list process includes a web-based interface for accessing OPL data. Databases are provided for storing updated OPL parameter values for use in resolving the OPL process with respect to a particular operation cycle. The OPL data is provided in a format that is accessed and modified by various parties, with updates and notifications provided accordingly. Access to past OPL cycles is also provided.

21 Claims, 13 Drawing Sheets

SYSTEM FOR AUTOMATING OPERATING PARAMETER LIST PROCESS

BACKGROUND OF INVENTION

The present invention relates generally to a system for automating an Operating Parameter List process.

An Operating Parameter List (OPL) is used to analyze and determine the specific operating parameters (e.g., amount of fuel and highest operating temperature) for operations and processes of a power plant (e.g., boiling water reactor plants), and in particular, each plant operation cycle. Each time a new component part or replacement part is to be installed, an analysis using an OPL is needed. For example, before installing a new fuel set for a reactor, an analysis of the specific operating parameters using an OPL is performed to determine appropriate operating conditions ("OPL process"). This analysis may be performed, for example, in order to maximize the useful life of a fuel set.

The OPL process typically requires several iterations, with changes to the parameters typically occurring during each iteration. The changes may be proposed and then accepted, for example between a vendor and a customer. Many communications, which may include emails, faxes and letters/proposals via regular mail, are typically required to determine an agreed upon OPL. Thereafter, an OPL is finalized (e.g., agreement reached between vendor and customer).

Existing OPL processes involve the manual exchange of files (e.g., files having proposed OPL values) via e-mail, fax, or mail, which may result in delay and errors. This manual exchange includes the manual transcription of data, e-mail based communication with attached spreadsheet files, and resolving inconsistencies and disagreement, for example, between a vendor and utility customers through conventional channels (telephone, e-mail, fax, etc.). The extra time that may be required to complete the process, for example, to gather and coordinate the OPL data adds cost to the overall OPL process. Further, because of the added complexity of manual coordination, errors may result.

SUMMARY OF THE INVENTION

A system of the present invention provides automation of the OPL process, and in particular, a web-based application tool streamlines the process for handling the determination and finalization of an OPL. Using a web-based access, including, for example, a Customer Web Center (CWC), an interface for automating the OPL process is provided. The system allows for coordination and collaboration, for example, between a vendor and a utility customer, to arrive at a final set of parameter values for an OPL. By allowing all parties to review all the relevant OPL parameters on-line, the time needed to gather information is reduced.

In one embodiment of the present invention a system for automating an operation parameter list process is provided and includes a database for storing parameter value data, and a web-based interface for accessing the stored parameter value data and configured to automatically provide notification of modification to the parameter value data. The parameter value data may include parameter values for a boiling water reactor power plant cycle. Further, the automatic notification may include an email notification.

In another embodiment of the present invention a method of automating an operating parameter list process is provided and includes accessing a web-based interface configured to allow a user to view and modify parameter value data, inputting parameter values using the web-based interface, and receiving automatic notification of modification to the parameter values. Further, the method may include modifying the inputted parameter values, with the automatic notification (e.g., email notification) provided in response to the modification. The method may also include confirming the inputted parameter values.

In yet another embodiment of the present invention a method of automating an operating parameter list process is provided and includes generating an operating parameter list, storing the operating parameter list and associated parameter values in a database, allowing modification of the operating parameter list, updating the associated parameter values in the database based upon the modification to the operating parameter list, and providing notification of the modification to the operating parameter list. Further, the step of storing may include storing a modified operating parameter list in a first database and storing a finalized operating parameter list in a second database.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Although the present invention is described in connection with specific component parts with particular interfaces using specific data, such as particular spreadsheet files, it is not so limited, and different or additional component parts may be implemented with different or additional interfaces using different types of data.

A system constructed according to the principles of the present invention provides an automated OPL process using a web-based application tool to provide information to facilitate the OPL process. In general, a process for accessing an OPL automation application of the present invention begins with a utility customer user accessing a web-page (e.g., a web-page customized for their company), and wherein access to an applications section will allow access to an OPL automation application to users with proper user privileges.

The OPL automation application retrieves data for each individual plant from a file (e.g., an EXCEL file, EXCEL™ is a trademark of Microsoft Corporation) and saves the data in a database (e.g., Oracle™ database, Oracle™ is a trademark of the Oracle Corporation). The OPL automation application creates and stores files in different folders for each individual plant. The OPL automation application allows for coordination, for example, between vendor and utility customer users to reach agreement on a particular OPL data set for an operation cycle. In particular, users can access, view and input technical data relating to a particular OPL.

The OPL automation application presents the appropriate information (i.e., screen view) for a particular user, with a User ID based on a particular Plant Name. Log in access will be controlled using a Single Sign-On (SSO) session/authentication process. Once logged on, a user selects the plant and cycle for the OPL data on which they want to work (i.e., review or propose values for an OPL), and an automated process is thereafter provided. Both an intranet and extranet component is provided.

Figure 1:
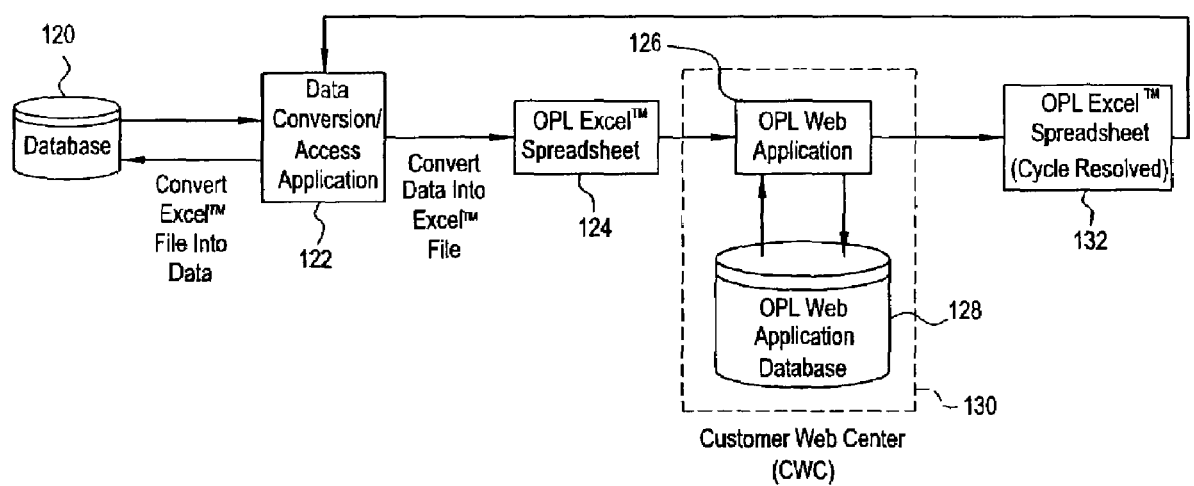
FIG. 1 is a detailed block diagram of an automated OPL process of the present invention.

More particularly, and as shown in FIG. 1, an automated OPL process of the present invention includes accessing a first database 120 (e.g., Engineering Data Bank (EDB) database) using a data conversion/access application 122 (e.g., an Electronic Generalized Application for Data Submittal (eGADS) Application implemented using Visual Basic® available from Microsoft Corporation) to obtain an existing OPL (i.e., existing OPL data). The data conversion/access application 122 then converts the accessed and retrieved OPL data into a format for access and viewing by a user, for example, a spreadsheet 124. It should be noted that a subroutine library may be provided as part of the first database 120 to allow for direct access to binary database files stored therein.

The spreadsheet 124 is accessed using a web-application 126 as described in more detail herein. Further, the spreadsheet 124, and in particular, updates to the spreadsheet 124, including any changes or revisions thereof and stores the updated spreadsheet into a second database 128 (e.g., OPL web-application database) accessed via the web-application 126. It should be noted that multiple versions of the spreadsheet 124 may be stored in the second database 128, for example, each time a vendor or utility customer makes proposed changes to the OPL in the spreadsheet 128.

The web-application 126 and second database 128 together form a Customer Web Center (CWC) 130 for accessing the spreadsheet(s) 124 and to facilitate finalizing of parameter values for a particular OPL. Once finalized (i.e., values resolved), a final spreadsheet 132 having the agreed upon OPL parameter values is stored in the first database 120. It should be noted that the data in the final spreadsheet 132 is converted into a format for storage in the first database 120 using the data conversion/access application 122. Further, the data within the first and second databases 120 and 128 may be encrypted (e.g., 128-bit SSL encryption).

Specifically, the web-application 126 provides functionality to access and modify OPLs in order to determine a final set of parameter values for the OPLs. In one embodiment, the web-application 126, as part of the CWC 130, provides a user with the following: an OPL home page, a vendor user start page, a customer user start page, a select plant function, a selection function for downloading or inputting data, a download file function (e.g., download spreadsheet file), an import file function, a data input and save function, a submit data function and a notice of save function. The web-application 126 provides to an administrator the following: an administrator home page and an edit folders function.

Figure 2:
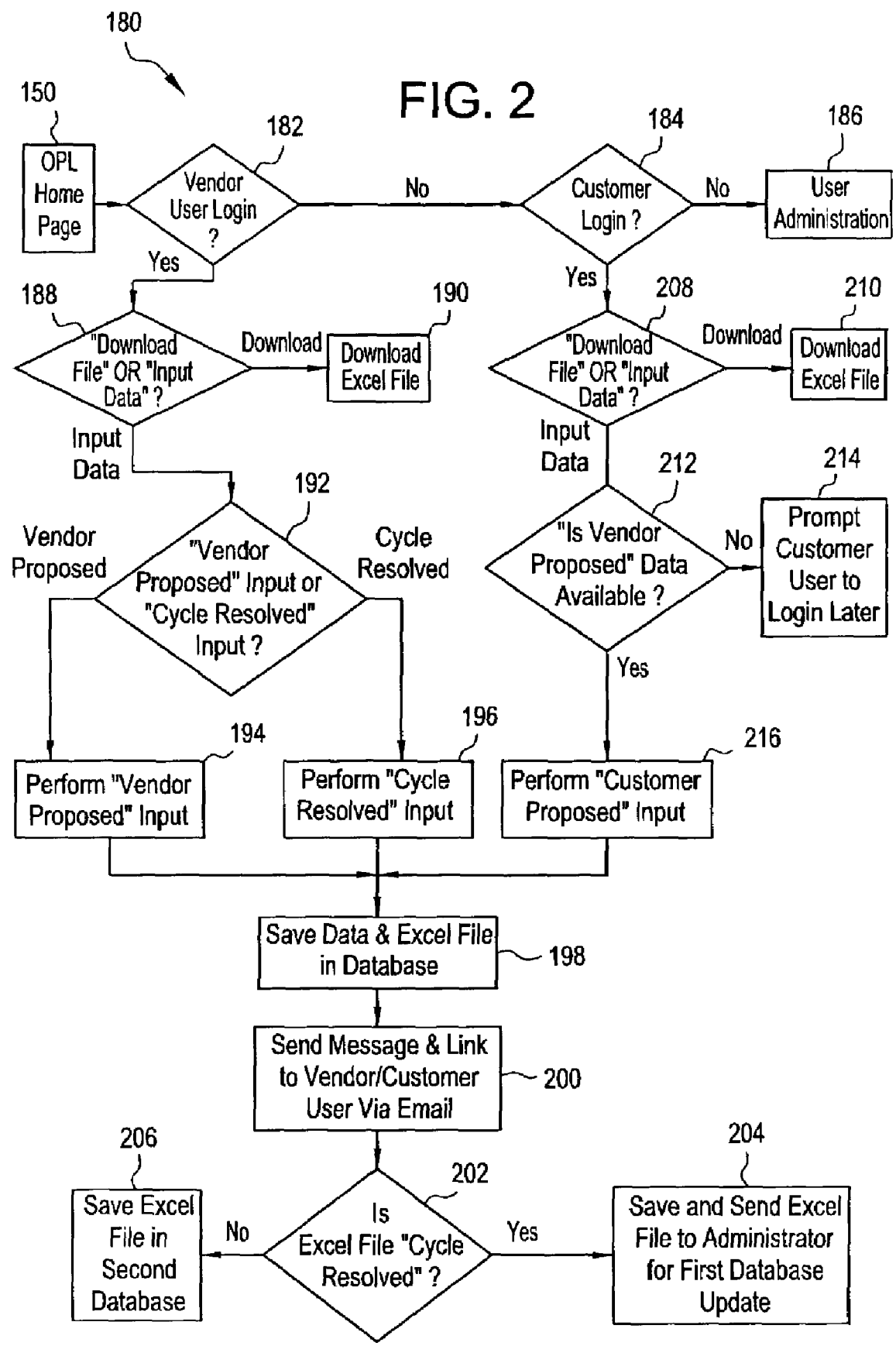
FIG. 2 is a flow chart of an automated OPL process of the present invention.

Using the CWC 130, parameter values for an OPL may be determined with one embodiment of an automated process 180 of the present invention shown generally in FIG. 2. In particular, the OPL home page 150 is accessed using the CWC 130, and specifically, the web-application 126 (shown in FIG. 1). A determination is made at 182 as to whether the login is by a vendor. If not, then a determination is made at 184 as to whether the login is by a customer. If the login is not by a vendor or customer, then the administrator web home page 170 is provided for login by an administrator at 186.

If the login is by a vendor, then at 188 a determination is made as to whether data is to be downloaded (e.g., download EXCEL™ file) or input. If a download is requested, then at 190 data is downloaded, and more particularly, an EXCEL™ file having the requested OPL is downloaded from the first database 120 (shown in FIG. 1) and stored in the second database 128 (shown in FIG. 1). If input of data is requested, then at 192 a determination is made as to whether the input is vendor proposed input or a cycle resolved input (i.e., vendor accepts customer parameter values). If it is a vendor proposed input, at 194 the vendor performs an input of proposed parameter values. If it is a cycle resolved input, then at 196, the vendor performs a cycle resolve input (i.e., accepts proposed customer values). After either input, the data, including an EXCEL™ file having an EXCEL™ spreadsheet is stored in the second database 128 (shown in FIG. 1) at 198. Thereafter at 200, a message and/or link is sent to the vendor and customer via email regarding the input (e.g., "vendor has entered new proposed parameter values, please review"). A determination is then made at 202 as to whether the cycle is resolved, and if it is, the data including the EXCEL™ file is stored in the first database 120 (shown in FIG. 1) at 204. This may include, sending the EXCEL™ file to an administrator for updating of the first database 120 (shown in FIG. 1). If the cycle is not resolved, the data including the EXCEL™ file remains saved in the second database 128 (shown in FIG. 1) at 206.

Referring now to the process performed if a determination is made at 184 that the login is by a customer, at 208 a determination is made as to whether data is to be downloaded (e.g., download EXCEL™ file) or input. If a download is requested, then at 210 data is downloaded, and more particularly, an EXCEL™ file having the requested OPL is downloaded from the second database 128 (shown in FIG. 1). If input of data is requested, then at 212 a determination is made as to whether vendor proposed data (i.e., proposed parameter values for the OPL) are available. If vendor proposed data is not available, then at 214 the customer user is prompted to login later. If vendor proposed data is available, then at 216 a customer proposed input is performed. In particular, a customer will review the proposed parameter values from the vendor and determine whether to accept or modify and propose some or all new parameter values. Thereafter, the data including the EXCEL™ file is stored as described above.

Figure 3:
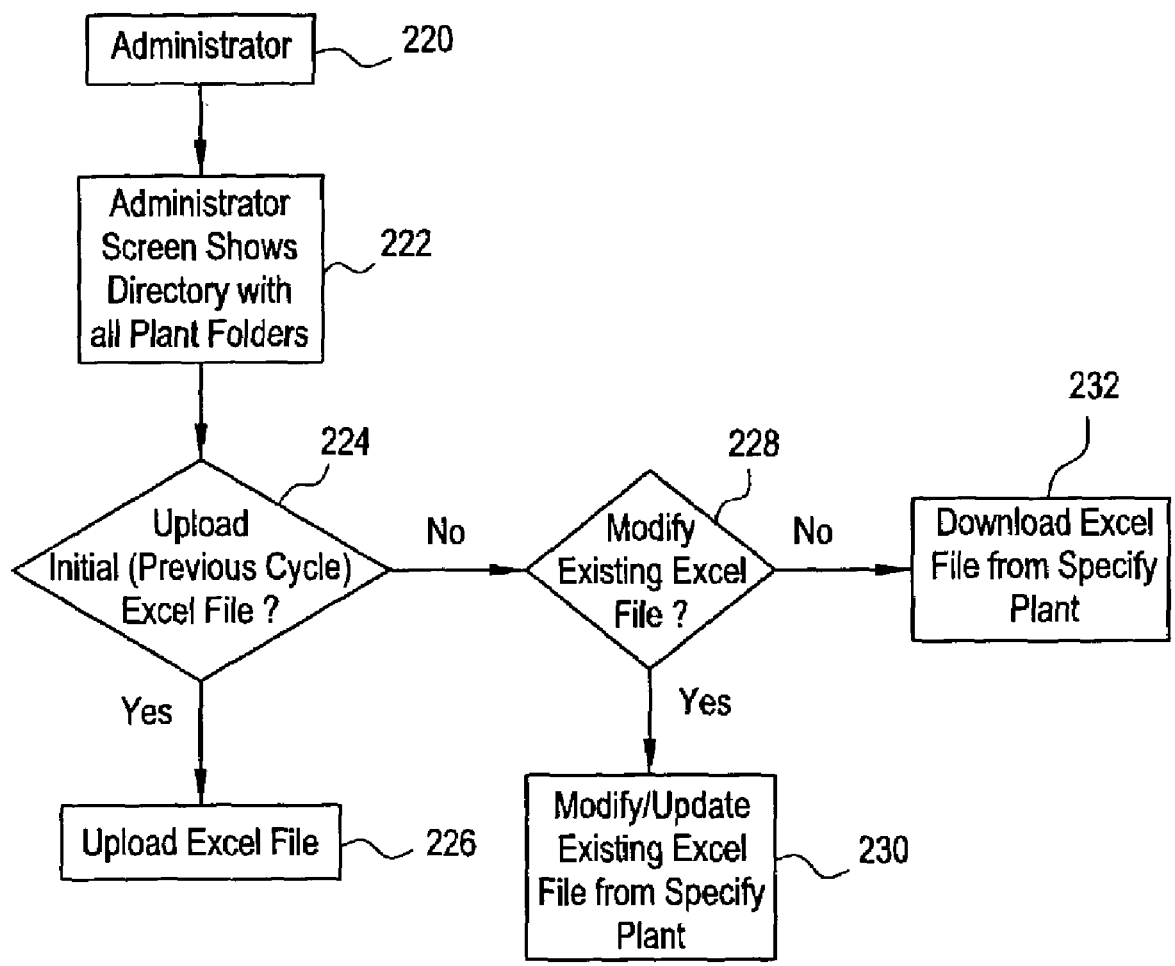
FIG. 3 is a flow chart of an administrator access process of the present invention.

Referring now to the process performed if a determination is made at 184 that the login is by an administrator, and as shown in FIG. 3, at 220 an administrator home page is provided. At 222 an administrator screen displays a directory showing all plant folders, which are virtual folders for each plant, and in which data including OPL files are stored for that particular plant. A determination is then made at 224 as to whether an upload of an initial (or previous cycle) EXCEL™ file is requested. If an initial EXCEL™ file is requested, then at 226, that file is uploaded. If an initial EXCEL™ file is not requested, then a determination is made at 228 is made as to whether a modification of an existing EXCEL™ file is requested. If an update is requested, then at 230 the EXCEL™ file for a specific plant in a plant folder is modified or updated. If no modification is requested as determined at 228, then a download of the EXCEL™ file for a specific plant in a plant folder is performed at 232.

Figure 4:
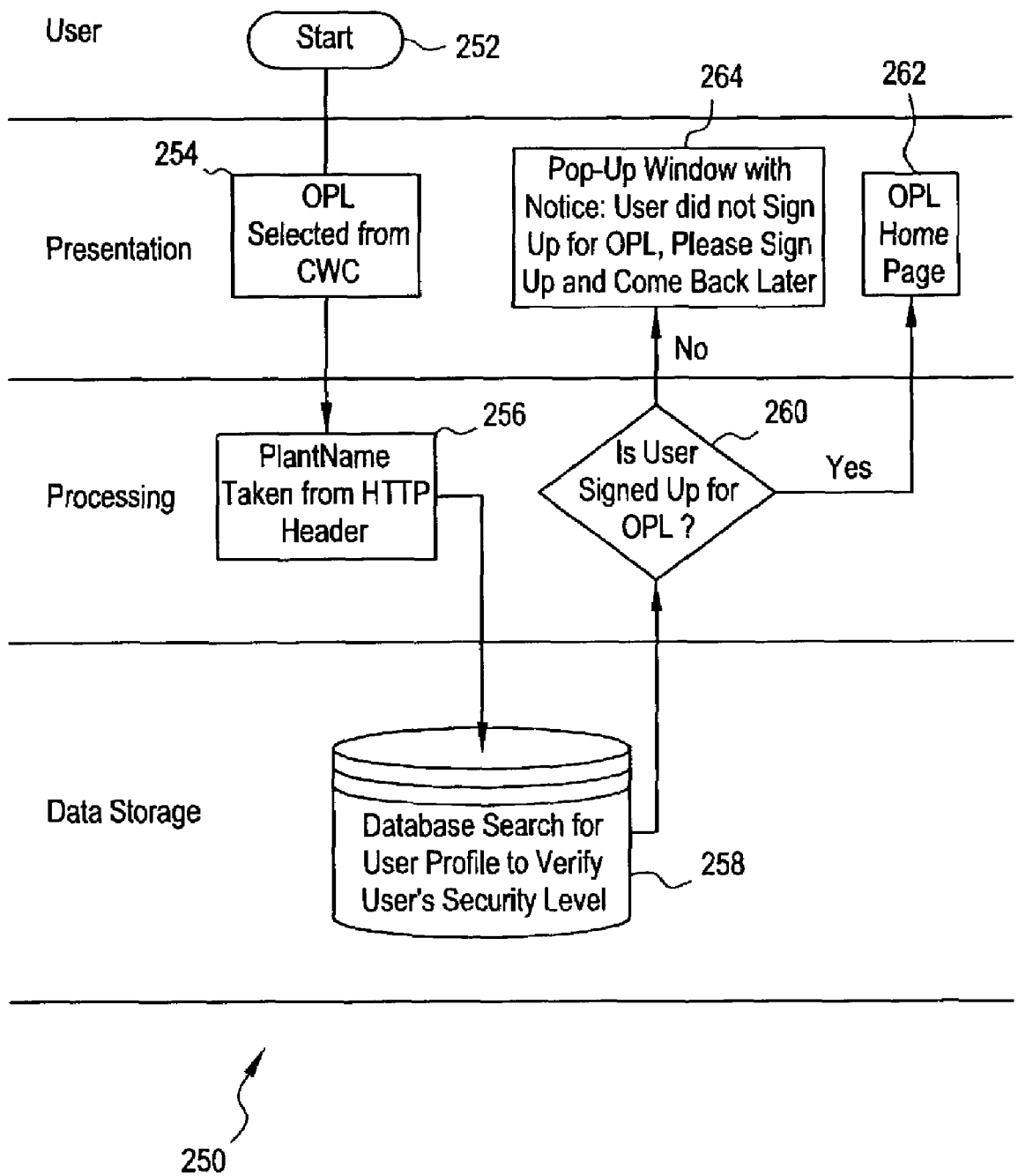
FIG. 4 is a flow chart of a log on process of the present invention.

Having described generally an automated OPL process of the present invention, one embodiment for accessing and modifying data, including EXCEL™ files having OPL data therein will be described. A logon process 250 as shown in FIG. 4 preferably begins the automated OPL process. The process starts at 252 and the OPL web-application 126 (shown in FIG. 1) is accessed from the CWC 130 (shown in FIG. 1) at 254. Each user that is allowed access to the CWC 130 (shown in FIG. 1) is provided a Lightweight Directory Access Protocol (LDAP) to allow for single sign-on capability to access data for different plants. An LDAP record allows for partitioning customers and their corresponding access rights into specific subdirectories. Further, navigational and content customization may be provided based upon the data received from the customer's LDAP record. In particular, the customer's LDAP record and in particular the LDAP definition of a PlantName dynamically controls access by a customer user.

Specifically, the PlantName is obtained from the HTTP header of the customer user accessing the CWC 130 (shown FIG. 1). A database search is performed at 258 for the user's profile to verify the user's security level (e.g., access rights). Essentially, the user's SSO information in the HTTP header is checked for restrictions, and the SSO plant name is used in combination with the user information to look up in a table the privileges for the user and the documents the user can access. This authentication and authorization process may be performed using known programs, including for example, SiteMinder available from Netegrity.

Thereafter, at 260 a determination is made as to whether the user is signed up for the OPL web-application 126 (shown in FIG. 1). If the user is signed up, then the OPL home page is displayed at 262. If not, the user is prompted to sign up and log in later at 264. Authentication and authorization requires at least entry of a username and password combination. Further, session cookies may be used to provide the user's LDAP information.

Further, the PlantName value may be parsed to obtain the six character sub-directory name for use in resolving the path of several Java Sever Pages (JSPs) to include as commands as described herein. A Mask is also stored into the session memory if the user is a vendor employee. The Mask is used to supersede the path value parsed from the CompanyName. This allows vendor personnel to view the customer pages in exactly the same manner as the customer. Additionally, two parameters are used to control the presentation of various content. The main page (i.e., OPL home page) of the application decodes the values of the parameters and selects the appropriate JSP to include based on the path.

Figure 5:
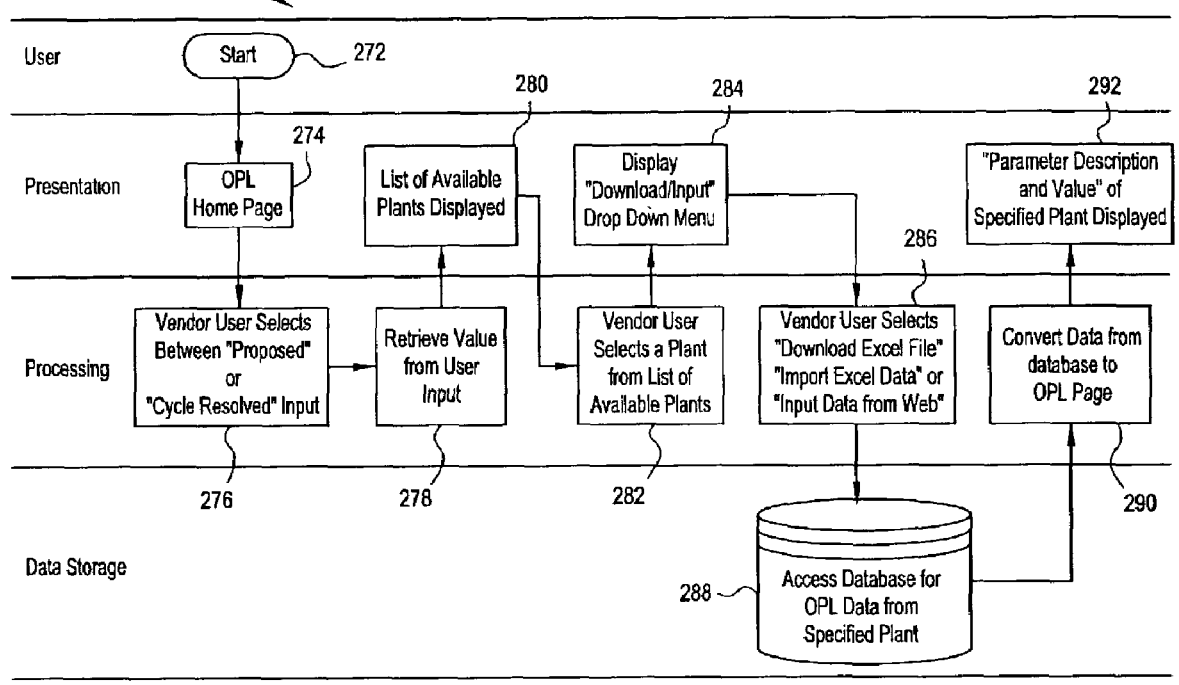
FIG. 5 is a flow chart of a vendor download or input of data process of the present invention.

After a user has logged on, and in particular a vendor user, a vendor download or input of data process 270 may be initiated at 272 as shown in FIG. 5. The OPL home page is displayed at 274 and a user is given the option to select either a proposed or cycle resolved input. The user then selects at 276 either the "Proposed input" or "Cycle Resolved". A value from the user input that represents the selection is then retrieved at 278 and a list of available plants is displayed at 280, for example using a drop down menu. The user then selects one or more plants at 282 and a drop down menu having further options is provided at 284. A user then selects at 286 either to "Download EXCEL™ file", "Import data from EXCEL™ file" or "Input data from the web". Thereafter, based upon the selected action, corresponding data (e.g., OPL data for an EXCEL™ spreadsheet) from the first database 120 (shown in FIG. 1) is retrieved at 288. The data is then converted from the database format to a format for display on the OPL home page at 290.

More specifically, if the user selects "Download EXCEL™ file", a user can download an EXCEL™ file from the web. If the user selects "Import data from EXCEL™ file", a user can import an EXCEL™ file from, for example, their PC. If a user selects "Input data from the web", parameter descriptions and values from the retrieved data for the specified plant will display on screen, for example, in an EXCEL™ spreadsheet, for user viewing and modification at 292.

Figure 6:
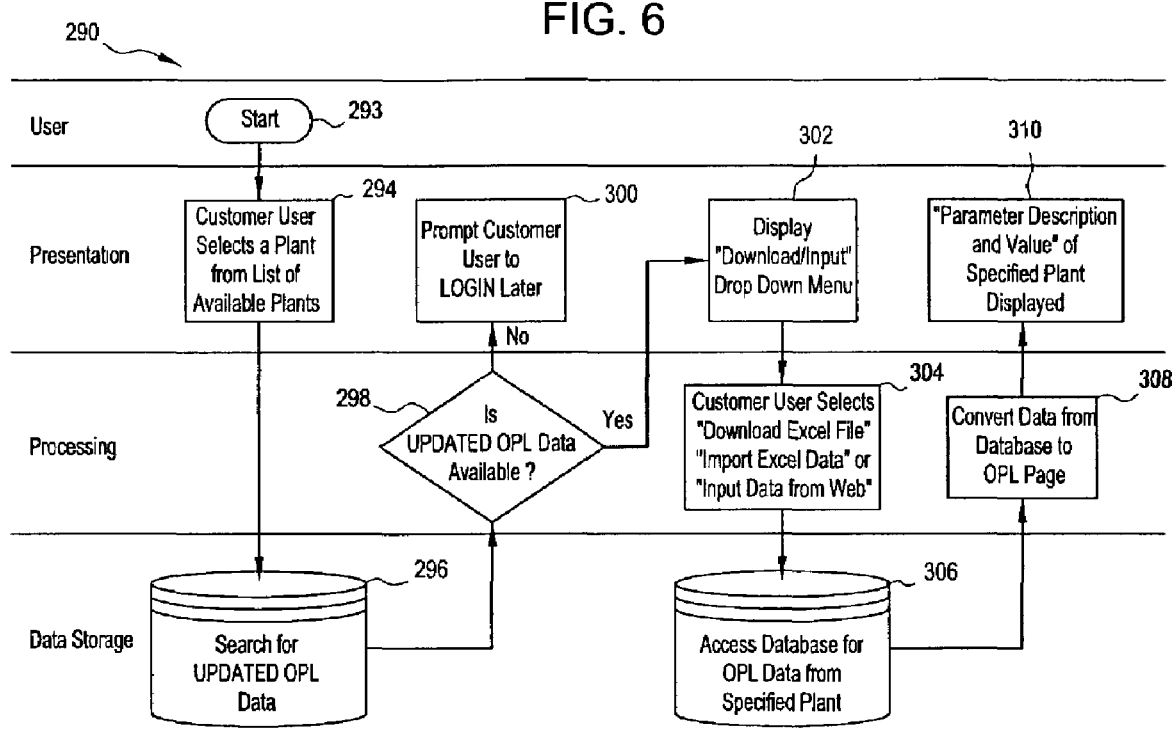
FIG. 6 is a flow chart of a customer download or input of data process of the present invention.

If a customer user has logged on, a customer download or input of data process 290 may be initiated at 293 as shown in FIG. 6. The OPL home page is displayed and a customer user selects a plant from a drop down menu of available plants at 294. A search for updated OPL data is then performed at 296. A determination is then made at 298 as to whether updated OPL data is available. If updated data is not yet available, the customer user is prompted to login later at 300. If updated data is available, then at 302 the customer user is given various download/input options. The customer user then selects "Download EXCEL™ file", "Import EXCEL™ data" or "Input data from the web" at 304. Corresponding data is then retrieved at 306 and the data converted from the database format to a format for display on the OPL home page at 308.

More specifically, if the user selects "Download EXCEL™ file", a user can download an EXCEL™ file from the web. If the user selects "Import data from EXCEL™ file", a user can import an EXCEL™ file from, for example, their PC. If a user selects "Input data from the web", parameter descriptions and values from the retrieved data for the specified plant will display on screen, for example, in an EXCEL™ spreadsheet, for user viewing and modification at 310.

Figure 7:
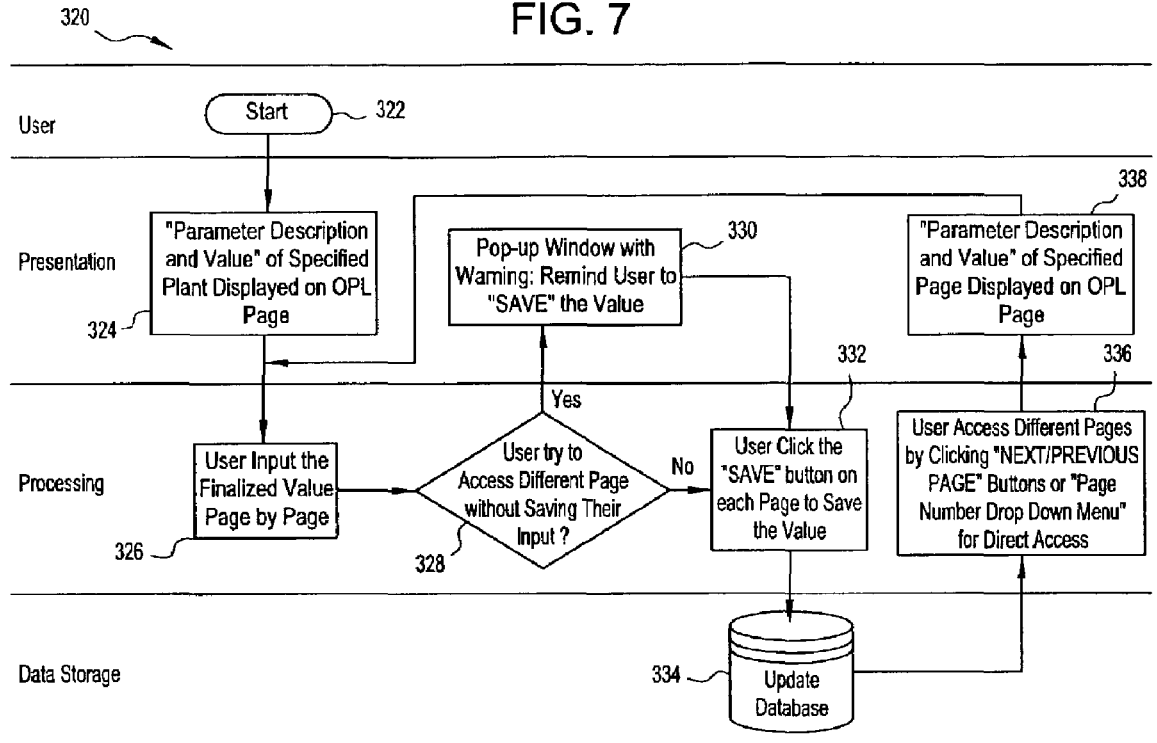
FIG. 7 is a flow chart of a data input process of the present invention.

With respect to inputting data, a data input process 320 is initiated at 322 as shown in FIG. 7. The parameter descriptions and values, if any for the OPL for the specified (i.e., selected) plant are displayed at 324. The user will then enter and/or modify (i.e., change) parameter values at 326, which may be limited by the particular users access rights. If more than one page (i.e., screen) of parameters is listed, a user will enter and/or modify parameter values on a page by page basis, for example using a Next Page/Previous Page button or a Page Number drop down menu. If a user tries to access a different page without saving their input at 328, a warning message is provided at 330 reminding the user to save the page before accessing another page. Once the user saves the OPL page (e.g., by clicking on a Save button) at 332, the second database 128 (shown in FIG. 1) is updated at 334. Thereafter, at 336, a user can access different pages for the particular OPL file (e.g., OPL EXCEL™ file). Again, the parameter descriptions and values, if any, for the OPL for the specified (i.e., selected) plant are displayed at 338, with the user again entering or modifying the values at 326.

Figure 8:
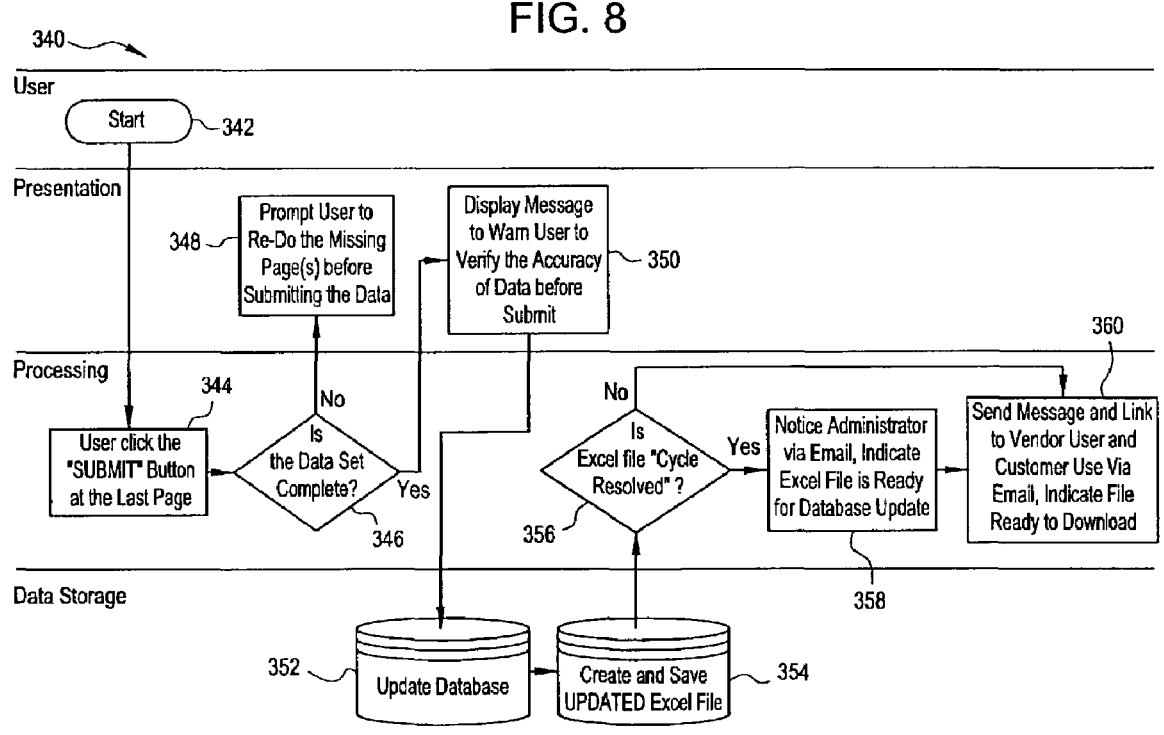
FIG. 8 is a flow chart of a data submission and OPL file creation process of the present invention.

After inputting the data (i.e., parameter values), a data submission and OPL file creation process 340 is initiated at 342 as shown in FIG. 8. A user at 344 selects (e.g., clicks with a mouse pointer) a Submit button at the last page of the OPL. A determination is then made at 346 as to whether the data set (i.e., parameter values for the OPL) is complete and all parameters have a specified value. If the data set is not complete, a user is prompted at 348 to review and re-enter parameter values for the missing pages, such as pages wherein the Save button was not selected. The data input process 320 is then again initiated. Once the data set is complete, a message is displayed at 350 to warn the user to verify the accuracy of the data before submitting it. Once verified, the second database 128 (shown in FIG. 1) is updated at 352, including updating the corresponding EXCEL™ file or creating and saving a new EXCEL™ file at 354. A determination is then made at 356 as to whether the cycle is resolved, such that the OPL is finalized and all parameter values are approved and accepted. If the cycle is resolved (i.e., system value equal "Cycle Resolved input"), the saved EXCEL™ file will be sent to the Administrator and the first database 120 (shown in FIG. 1) updated at 358. If the cycle is not resolved, a message and a link to the OPL file will be sent to both the vendor user and particular customer user via email at 360, indicating the EXCEL™ file is ready to download for review again.

Figure 9:
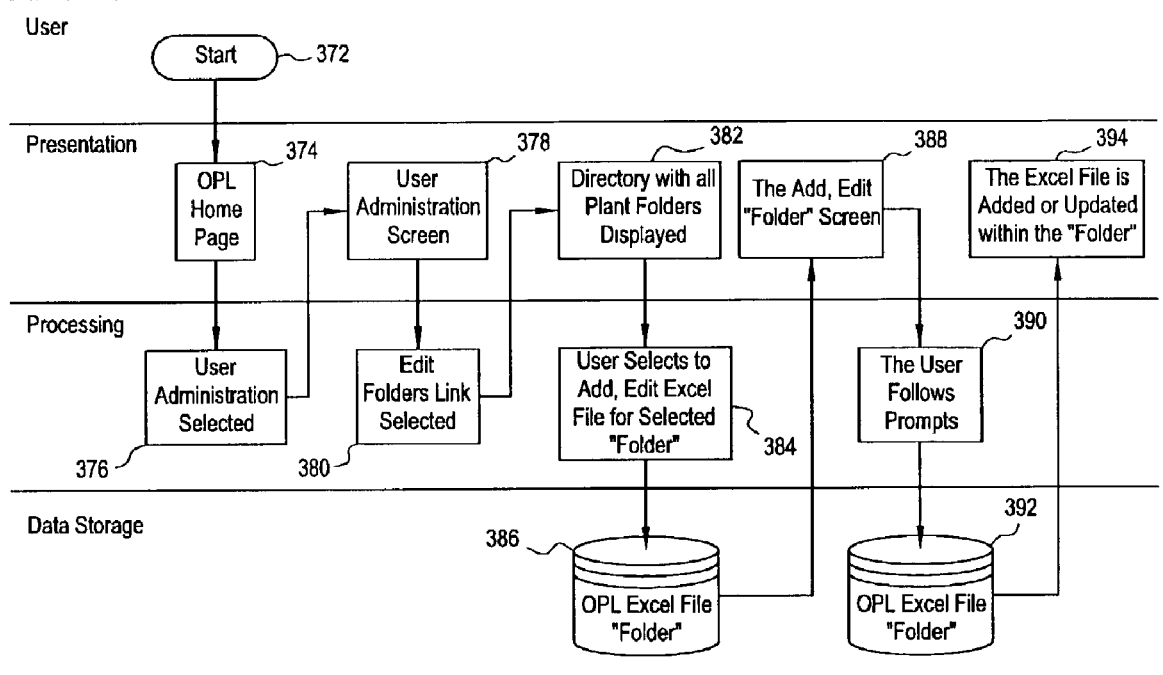
FIG. 9 is a flow chart of an administrator update process of the present invention.

An administrator update process 370 as shown in FIG. 9 may then be initiated at 372. The OPL home page is displayed at 374 and a user selects a user administration option at 376. A user administration page is then displayed at 378, and in which a user (i.e., administrator) may select an Edits Folder link at 380 to display a directory of all the plant folders at 382. A user may then select to add or edit an OPL file (e.g., EXCEL™ file) for the selected plant folder at 384. The OPL file in the folder is then accessed at 386 and an add/edit screen is displayed at 388 and provides user prompts at 390. In particular, a user may be prompted to edit a Previous Cycle folder, edit a Vendor Proposed folder, edit a Customer Proposed folder or edit a Cycle Resolved folder. This allows the administrator to access the folders at 392 and add or update OPL files at 394 within the selected folder, for example, when an OPL has been finalized. It should be noted that the updating of the folders may be provided by an administrator or by an automatic process with a notification of the update provided. For example, the first database 120 (shown in FIG. 1) may be automatically updated upon finalizing (i.e., confirmed and accepted) an OPL file.

With respect to the directory structure of the present invention, in one embodiment three levels are provided. The first, or top, level is the application root which contains the letters of the application (OPL). Under this folder are the JSPs, including a symbolic link called CWCRoot that contains the information for the CWC and the header files for the application, and thereunder two folders for the application, one for the images and another for the static content that will be the folder to update when OPL is provided to the first database 120 (shown in FIG. 1).

With the respect to the JSPs, the following may be provided:

(1) Home Page (index.jsp) This is the first page the user will view. It will connect to the User Start Page and Customer User Start Page.

(2) Vendor User Start Page (gestart.jsp) This page allows the vendor user to specify which input cycle to work on within the reload cycle.

(3) Customer User Start Page (customerstart.jsp) This page will connect to Select Plant page.

(4) Select Plant Page (plantselect.jsp) This provides the list view of available plants based on user privilege.

(5) Download EXCEL™ file OR Input Data Page (actiontype.jsp) This provides the list view of available functions.

(6) Import EXCEL™ file Page (dataimport.jsp) This page provides functionality to import data from an EXCEL™ file.

(7) Data Input and Save Page and Submit Data Page (datainput.jsp) This page allows a user to perform data input and submit data from a browser.

(8) Notice of Save Page (noticeofsave.jsp) This page will notify the user of completion of data input.

(9) Download Page (download.jsp) This page provides the list view of available EXCEL™ files and allows the user to download the files.

(10) Administrator Page (geadmin.jsp) This is the first page the Administrator will view after being connected to the OPL home page.

(11) Edit Folders Page (folderadmin.jsp) This page provides a capability for new folders to be added to the web-application.

Further, the following servlets (e.g., programs running on a server) may be provided:

(1) Folder Administration Servlet (FolderAdminServlet) This servlet handles plant folder uploads and modification to folder information.

(2) Folder Search Servlet (FolderSearchServlet) This servlet handles database searches.

Additionally, the following bean (e.g., program component for use by the servlets) may be provided:

Folder (Folder) This bean will contain all of the information about a specific folder where the OPL file (e.g., EXCEL™ file) will be stored for a specific plant, and will have the following format.

Figure 10:
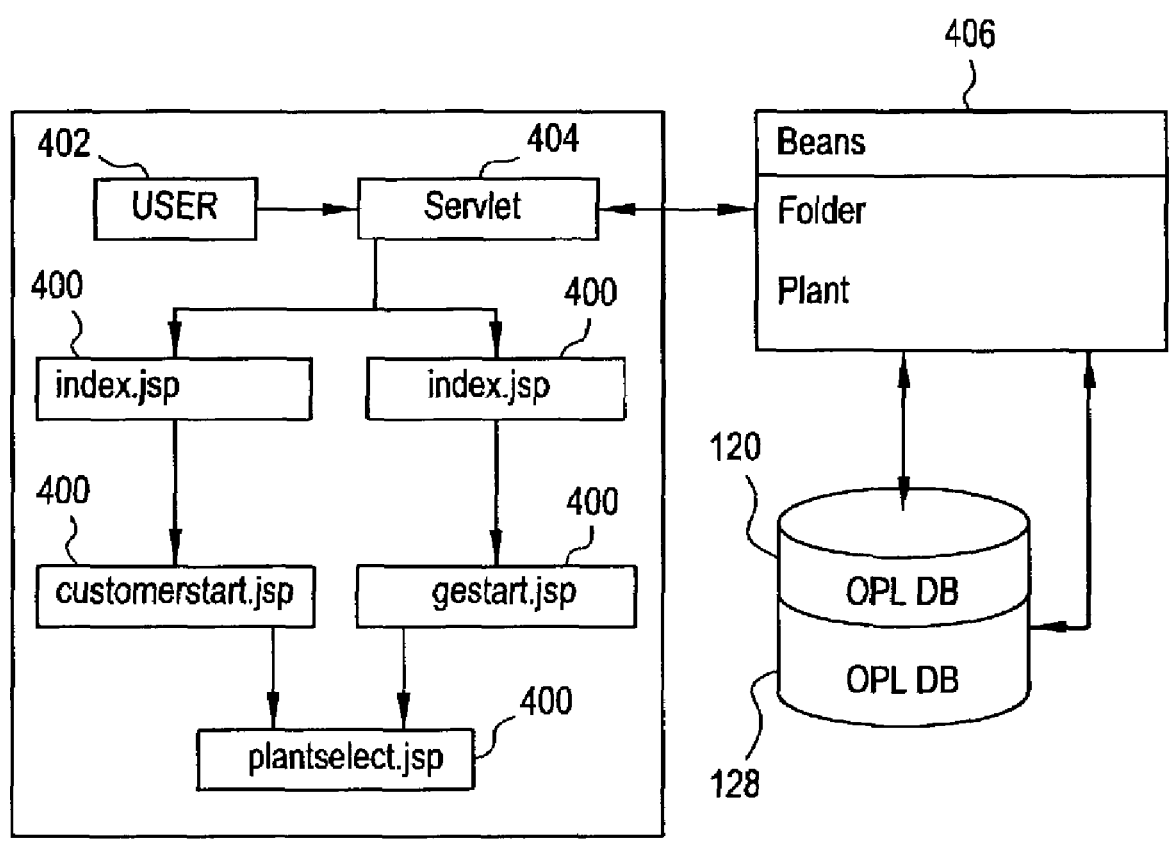
FIG. 10 is block diagram of a web architecture of an automated OPL process of the present invention.

Folder
–FolderName : String
–FolderId : String
+getFolderName( ) : String
+setFolderName(newFolderName : String) : void In one embodiment as shown in FIG. 10 the JSPs 400 are accessed by a user 402 via the servlets 404. The servlets 404 are provided in connection with the beans 406 to access the appropriate data in the OPL databases 120 and 128.

Figure 11:
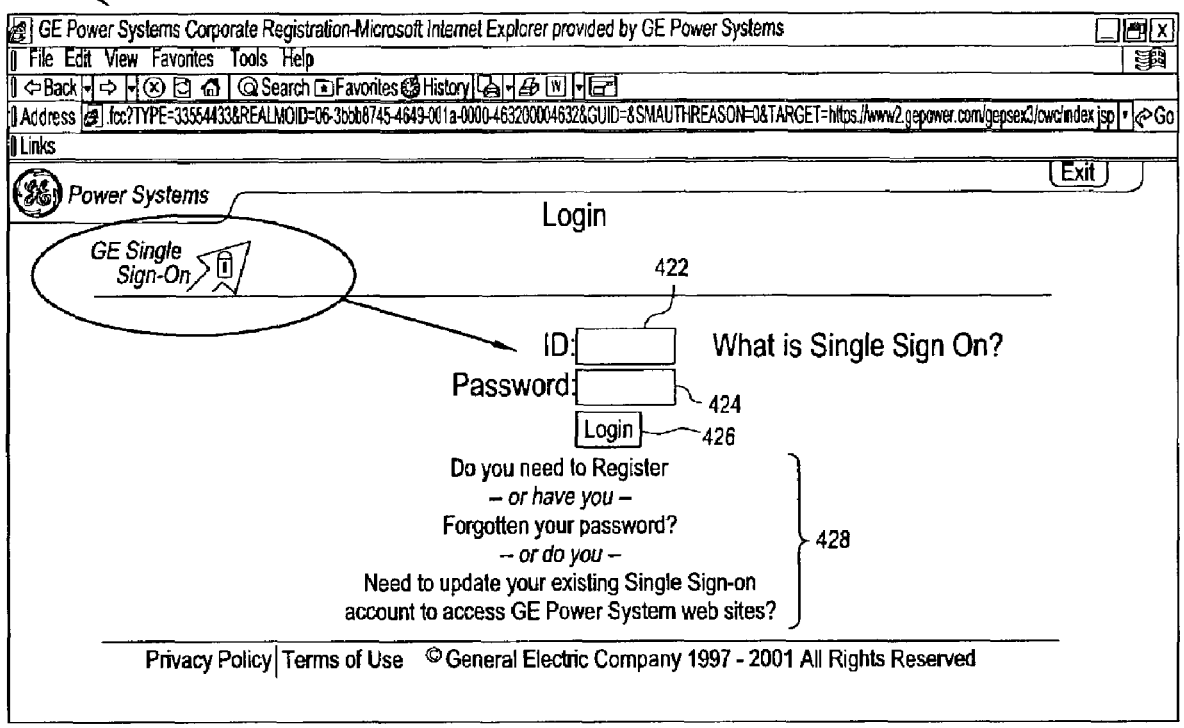
FIG. 11 is a screen shot of a login page of the present invention.

In operation, a user accesses the CWC 130 (shown in FIG. 1) using a Login page 420 as shown in FIG. 11. A user enters an ID (i.e., username) in the ID field 422, a password in the password field 424, and initiates the log on process 250 as shown in FIG. 4 by selecting (e.g., clicking with a mouse pointer) the Login button 426. A user may also select a new password/forgot password member 428 if a new password is needed (i.e., new user) or if the password has been forgotten. After logging on, a CWC home page is displayed. The CWC home page includes selectable members, and in particular, a selectable member for accessing the OPL web-application 126. Upon selecting the OPL selectable member, an OPL main page is displayed.

Figure 12A:
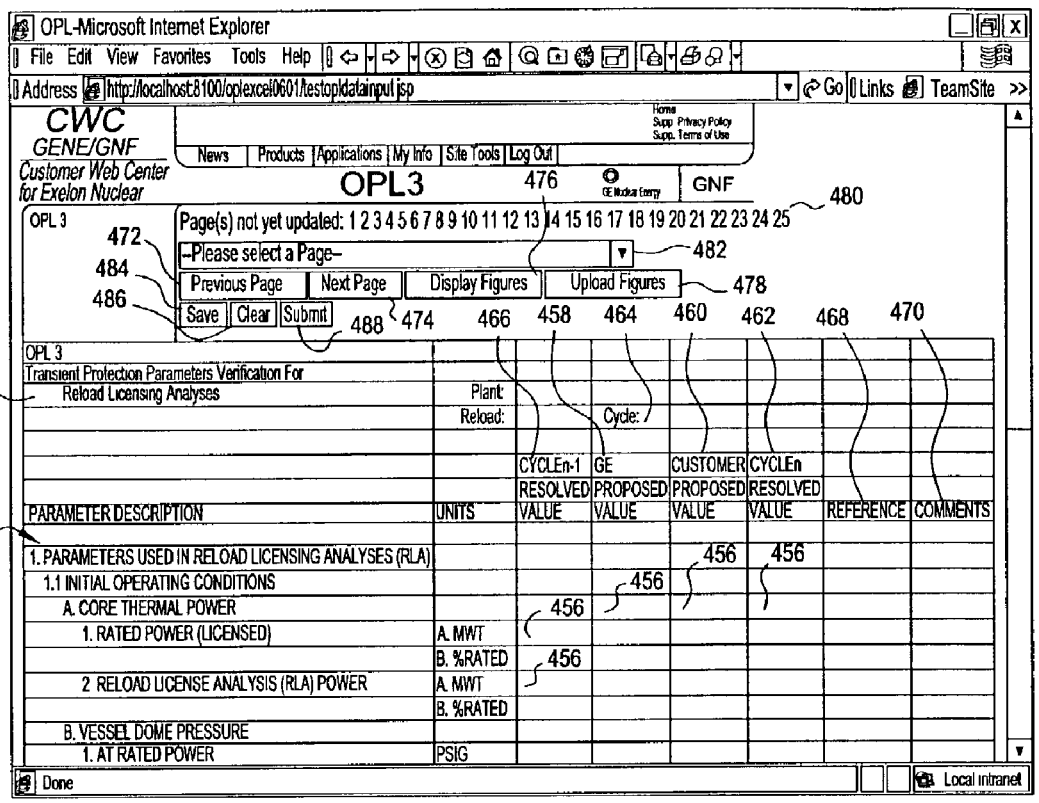
FIGS. 12(*a*) and (*b*) are screen shots of an OPL page of the present invention.
Figure 12B:
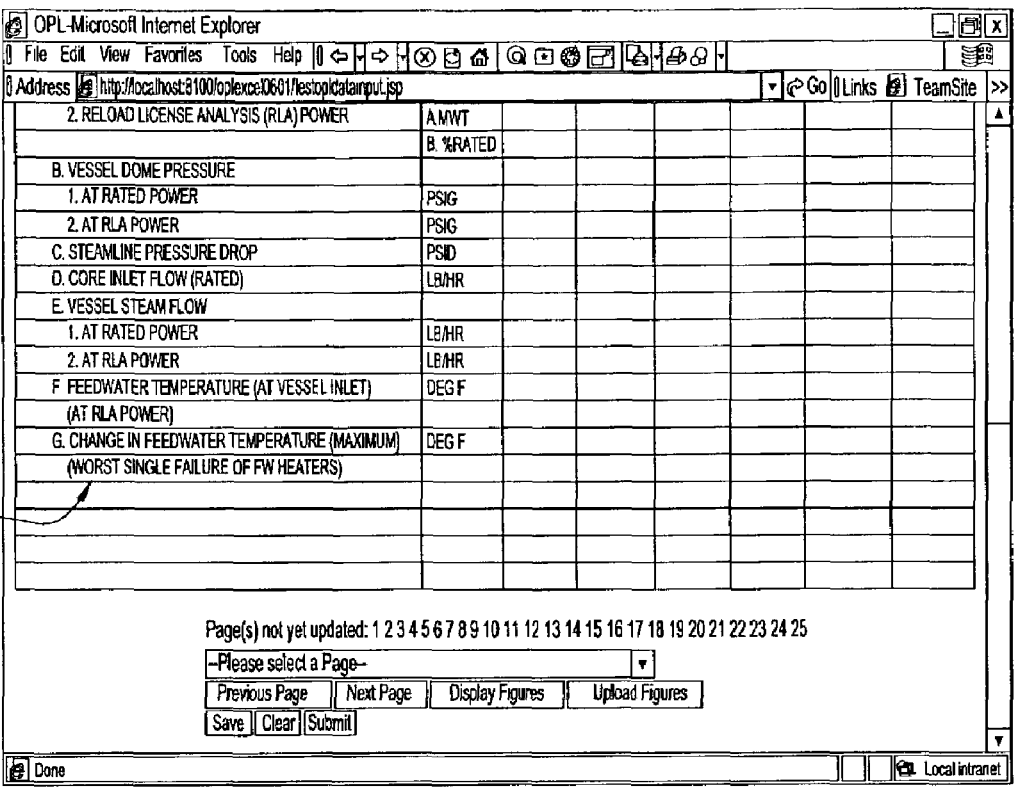

Upon accessing the OPL main page, a user may access OPL files (e.g., EXCEL™ files) using pull down menus as described herein. Further, a user may modify existing OPL files and create new OPL files (e.g., project manager initiates a new cycle). Upon requesting a new OPL, an OPL page 450 is displayed as shown in FIGS. 12(a) and (b). A user can scroll upward and downward on the OPL page 450 in any known manner (e.g., using scroll bar) to view content on the entire OPL page 450. The OPL page 450 identifies the project to which the OPL applies at 452 and includes a list 454 of parameter descriptions for the identified project. For each parameter an input cell 456 is provided to input a corresponding parameter value. Separate columns are provided for a vendor proposed value at 458, a customer proposed value at 460 and a resolved (i.e., agreed upon) value at 462 for each cycle (i.e., operation cycle for a process in a power plant) identified at 464. A column 466 for the resolved value from a previous cycle is also provided. A reference column 468 for providing a reference indication (e.g., independent analysis) and a comments column 470 for providing comments are also included.

The OPL page 450 also includes a Previous Page selectable member 472 for accessing a previous OPL page, a Next Page selectable member 474 for selecting a next OPL page, and an Upload Figures selectable member 478 and a Display Figures selectable member 476 for uploading and displaying graphs relating the particular OPL file (e.g., graph(s) of Steam Flow v. TCV Position). An indication showing OPL pages 450 not yet updated at 480 is also provided. Further, a page selection field 482 is provided for accessing another specific OPL page 450.

A save selectable member 484 for saving the OPL page 450 once parameter values have been entered is provided. A clear selectable member 486 is provided for clearing the parameter values in the OPL page 450 being displayed. A submit selectable member 488 is also provided for submitting the parameter values once they have been entered on all the OPL pages 450 for the OPL file. With respect to the resolved value, if the two proposed values are the same, the resolved value column 462 is automatically filled in with that value. If the value is changed by the customer, then the resolved value remains blank or alternately, may be automatically filled in with the customer proposed number.

Thus, parameter values are entered, and thereafter saved in the database(s) and submitted for use in resolving (i.e., reaching agreement) the OPL process as described herein. Automatic emails and notifications as described herein may also be generated and transmitted upon the completion of the various stages in the OPL process (e.g., vendor enters and submits proposed parameter values for consideration and/or approval).

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A system for automating an operation parameter list process, comprising:
    a database for storing parameter value data; and
    a web-based interface for accessing the stored parameter value data and configured to automatically provide notification of modification to the stored parameter value data, wherein an analysis of an operating parameter is performed using the operation parameter list to determine appropriate operating conditions of the system.

2. The system according to claim 1 wherein the database is configured to store modified parameter value data.

3. The system according to claim 2 further comprising a second database for storing finalized parameter value data.

4. The system according to claim 1 further comprising a conversion component for converting the parameter value data between a format for storing in the database and a format for access using the web-based interface.

5. The system according to claim 1 wherein the parameter value data comprises parameter values for a boiling water reactor power plant cycle.

6. The system according to claim 1 wherein the automatic notification comprises an email notification.

7. The system according to claim 1 wherein the database is configured to automatically store modifications to the parameter value data.

8. The system according to claim 1 wherein the web-based interface is configured to provide different levels of user access to the parameter value data.

9. The system according to claim 1 wherein the web-based interface is configured to generate a parameter list with parameter values therein stored in the database.

10. A method of automating an operating parameter list process, comprising:
    accessing a web-based interface configured to allow a user to view and modify parameter value data;
    inputting parameter values using the web-based interface;
    receiving automatic notification of modification to the stored parameter values; and
    performing an analysis of an operating parameter using the operation parameter list to determine appropriate operating conditions.

11. The method according to claim 10 further comprising modifying the inputted parameter values, and wherein the automatic notification is provided in response to the modification.

12. The method according to claim 11 wherein the automatic notification comprises email notification.

13. The method according to claim 10 wherein the parameter values comprise parameter values for a boiling water reactor power plant cycle.

14. The method according to claim 10 wherein the parameter values are configured as a parameter list displayed as part of a spreadsheet for access by a user.

15. The method according to claim 10 wherein the web-based interface is configured to provide different levels of access to the parameter value data based upon access rights for a user.

16. The method according to claim 10 further comprising confirming the inputted parameter values.

17. A method of automating an operating parameter list process, comprising:
    generating an operating parameter list;
    storing the operating parameter list and associated parameter values in a database;
    allowing modification of the stored operating parameter list;
    updating the associated parameter values in the database based upon the modification to the stored operating parameter list; and
    performing an analysis of an operating parameter using the operation parameter list to determine appropriate operating conditions;
    providing notification of the modification to the operating parameter list.

18. The method according to claim 17 wherein the operating parameter list comprises operating parameter values for a boiling water reactor power plant cycle.

19. The method according to claim 17 where the step of storing comprises storing a modified operating parameter list in a first database and storing a finalized operating parameter list in a second database.

20. The method according to claim 17 wherein the notification comprises email notification.

21. The method according to claim 17 further comprising limiting access to the operating parameter list based upon user access rights.

* * * * *